United States Patent
Ishiwaka et al.

(10) Patent No.: US 12,475,205 B2
(45) Date of Patent: Nov. 18, 2025

(54) AUTHENTICATION DEVICE, AUTHENTICATION METHOD, AND COMPUTER-READABLE STORAGE MEDIUM

(71) Applicant: SoftBank Corp., Tokyo (JP)

(72) Inventors: Yuko Ishiwaka, Tokyo (JP); Kazuto Suda, Tokyo (JP)

(73) Assignee: SoftBank Corp., Tokyo (JP)

( * ) Notice: Subject to any disclaimer, the term of this patent is extended or adjusted under 35 U.S.C. 154(b) by 60 days.

(21) Appl. No.: 18/662,878

(22) Filed: May 13, 2024

(65) Prior Publication Data
US 2024/0296213 A1    Sep. 5, 2024

Related U.S. Application Data

(63) Continuation of application No. PCT/JP2022/043622, filed on Nov. 25, 2022.

(30) Foreign Application Priority Data

Dec. 1, 2021    (JP) .................................. 2021-195774

(51) Int. Cl.
*G06F 21/00* (2013.01)
*G06F 21/32* (2013.01)

(52) U.S. Cl.
CPC .................... *G06F 21/32* (2013.01)

(58) Field of Classification Search
CPC .......... G06F 21/32; G06F 3/011; G06F 21/31; H04L 63/0861; H04L 63/08
See application file for complete search history.

(56) References Cited

U.S. PATENT DOCUMENTS

| 2018/0089408 A1* | 3/2018 | Cheung ................... G06F 21/32 |
| 2019/0197224 A1* | 6/2019 | Smits ................... G06V 40/176 |
| 2020/0151308 A1* | 5/2020 | Phillips ............ G06Q 20/40145 |

FOREIGN PATENT DOCUMENTS

| JP | 2017058808 A | 3/2017 |
| JP | 2021508870 A | 3/2021 |
| JP | 2021170205 A | 10/2021 |

OTHER PUBLICATIONS

International Search Report and Written Opinion (ISA/237) of the International Search Authority for International Patent Application No. PCT/JP2022/043622, mailed by the Japan Patent Office on Feb. 14, 2023.

* cited by examiner

*Primary Examiner* — Yogesh Paliwal

(57) ABSTRACT

Provided is an authentication device which includes an authentication moving picture obtaining unit which obtains authentication moving picture in which a person is captured for authentication and an authentication unit which authenticates the person based on the motions of the facial muscle of the person identified by analyzing the authentication moving picture. Provided is an authentication device which includes an authentication moving picture obtaining unit which obtains authentication moving picture in which a person is captured for authentication while walking and an authentication unit that authenticates the person based on the motions of the body muscles of the person identified by analyzing the authentication moving picture.

21 Claims, 10 Drawing Sheets

310

| Time | Vertices 0.x | Vertices 0.y | Vertices 0.z |
|---|---|---|---|
| 0 | 214 | 231 | 2 |
| 33.333333 | 214 | 231 | 2 |
| 66.666666 | 210 | 230 | 1 |
| 99.999999 | 208 | 230 | 2 |
| 133.333332 | 207 | 229 | 1 |
| 166.666665 | 210 | 231 | 2 |
| 199.999998 | 212 | 230 | 2 |
| 233.333331 | 222 | 228 | 2 |
| 266.666664 | 231 | 220 | 1 |
| 2999.999997 | 213 | 231 | 1 |
| 333.333330 | 220 | 221 | 1 |
| ⋮ | ⋮ | ⋮ | ⋮ |

| Time | Vertices 0.x | Vertices 0.y | Vertices 0.z |
|---|---|---|---|
| 0 | 0 | 0 | 0 |
| 33.333333 | 2 | 1 | 0 |
| 66.666666 | 4 | 0 | -1 |
| 99.999999 | -6 | 0 | 1 |
| 133.333332 | 2 | -1 | 2 |
| 166.666665 | -4 | 2 | -2 |
| 199.999998 | 0 | -2 | 1 |
| 233.333331 | 10 | -2 | 1 |
| 266.666664 | 21 | -8 | -2 |
| 2999.999997 | -8 | 3 | 1 |
| 333.333330 | -4 | -2 | 0 |
| ⋮ | ⋮ | ⋮ | ⋮ |

FIG.3

AUTHENTICATION DEVICE, AUTHENTICATION METHOD, AND COMPUTER-READABLE STORAGE MEDIUM

The contents of the following patent application(s) are incorporated herein by reference:
NO. 2021-195774 filed in JP on Dec. 1, 2021
NO. PCT/JP2022/043622 filed in WO on Nov. 25, 2022

BACKGROUND

1. Technical Field

The present invention relates to an authentication device, an authentication method, and a computer-readable storage medium.

2. Related Art

Patent Document 1 describes a technique for obtaining a face image of a user and authenticating the user by using information related to the feature point included in the face image.

PRIOR ART DOCUMENT

Patent Document

Patent Document 1: Japanese Patent Application Publication No. 2021-170205

The summary clause does not necessarily describe all necessary features of the embodiments of the present invention. The present invention may also be a sub-combination of the features described above.

BRIEF DESCRIPTION OF THE DRAWINGS

FIG. 2 schematically shows an example of a feature amount 310.
FIG. 3 schematically shows an example of the feature amount 320.

DESCRIPTION OF EXEMPLARY EMBODIMENTS

Identifying an individual through facial recognition or biometrics is important for security. However, the method that takes feature amounts in the form of 2D or 3D has a problem in fully addressing fake images or the like created by using photographs or 3D printers. In addition, biometrics requires a special device, a long time for measurement in the first place, removing makeup (in the case of face vein), finger prints, which some people cannot provide and can be faked, and the like, and these problems have not been fully resolved. The authentication device 100 according to the present embodiment performs authentication by using feature amounts obtained by tracking motions of facial muscles during facial recognition, for example. Moving muscles requires motor neurons. The number of motor neurons is highest at birth and decreases for optimization as they learn the way to move muscles. Because of this, the ways to move muscles are different among individuals due to gene information from birth and optimization caused by the environment. Even if the genes are identical and the features of faces are similar, as in the case of twins, the ways to move muscles are different. In addition, the authentication device 100 according to the present embodiment can also further improve precision by extracting feature amounts on the basis of the gait of a person who approaches a camera. As with a facial expression, the gait also has a distinctive feature because the numbers and connectome of motor neurons are different among individuals.

Hereinafter, the present invention will be described through embodiments of the invention, but the following embodiments do not limit the invention according to the claims. In addition, not all of the combinations of features described in the embodiments are essential to the solution of the invention.

Figure 1:
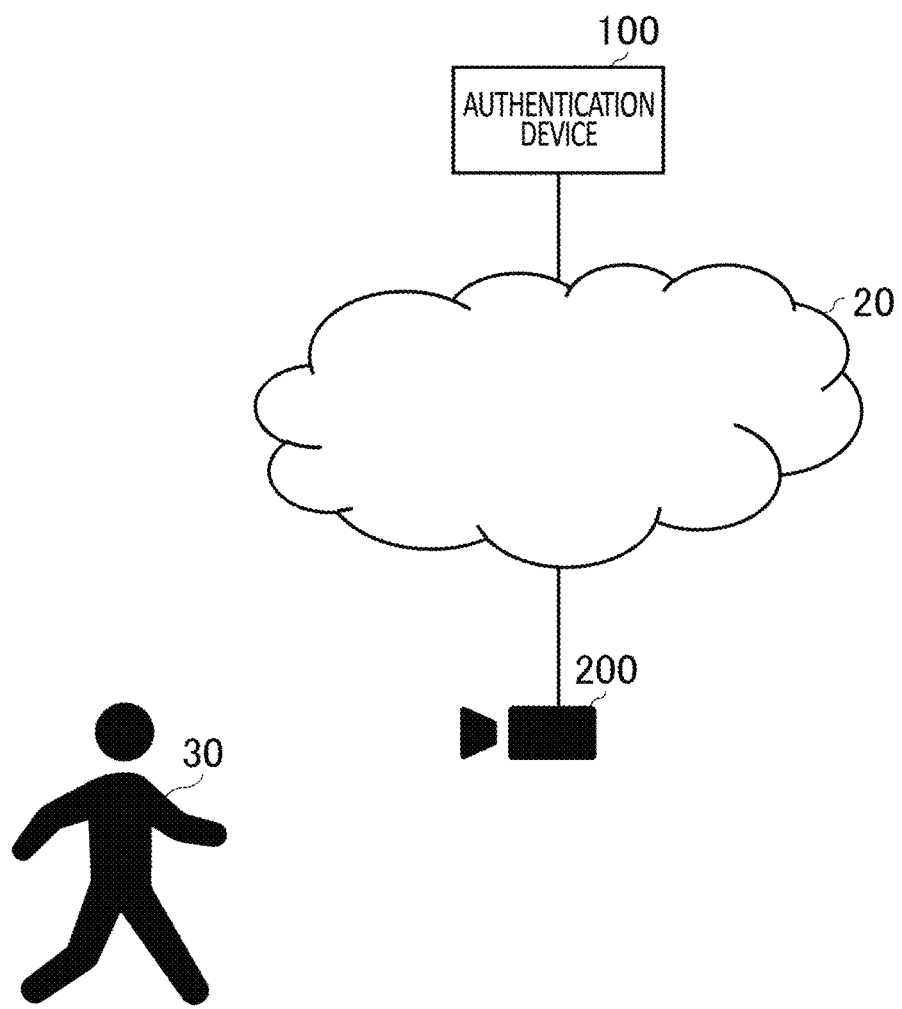
FIG. 1 schematically shows an example of a system 10.

FIG. 1 schematically shows an example of the system 10. The system 10 includes the authentication device 100 and the camera 200.

The authentication device 100 and the camera 200 may communicate via a network 20. The network 20 may include the Internet. The network 20 may include a LAN (Local Area Network).

The network 20 may include a mobile communication network. The mobile communication network may conform to any of the 3G (3rd Generation) communication system, the LTE (Long Term Evolution) communication system, the 5G (5th Generation) communication system, and the 6G (6th Generation) communication system and the communication system of the subsequent generation.

The authentication device 100 may be connected to the network 20 via a wired connection. The authentication device 100 may be connected to the network 20 via a wireless connection. The authentication device 100 may be connected to the network 20 via a wireless base station. The authentication device 100 may be connected to the network 20 via a Wi-Fi (registered trademark) access point.

The camera 200 may be connected to the network 20 via a wired connection. The camera 200 may be connected to the network 20 via a wireless connection. The camera 200 may be connected to the network 20 via a wireless base station. The camera 200 may be connected to the network 20 via a Wi-Fi access point.

It is noted that the authentication device 100 and the camera 200 may be directly connected to each other. In addition, the authentication device 100 may incorporate the camera 200.

The authentication device 100 receives, from the camera 200, the captured image captured by the camera 200. The authentication device 100 may receive, from the camera 200, the captured image of a person 30 captured by the camera 200. The authentication device 100 may receive, from the camera 200, the moving picture of the person 30 captured by the camera 200.

The camera 200 is installed at any location where authentication of the person 30 is needed. If the authentication device 100 incorporates the camera 200, the authentication device 100 may be set at any location where authentication of the person 30 is needed.

The camera 200 may have a depth sensor. The authentication device 100 may receive, from the camera 200, the captured image including the depth information detected by a depth sensor of the camera 200.

The authentication device 100 may receive, from the camera 200, the registration moving picture of the person 30 captured by the camera 200 for registration. Capturing for registration may involve informing the person 30 that he/she is captured for registration and capturing the person 30 by using the camera 200. Capturing for registration may involve capturing the person 30 by using the camera 200 while the camera 200 is set in the registration mode. Capturing for registration may involve registration mode and capturing the person 30 by using the camera 200 while the authentication device 100 is set in the registration mode.

The authentication device 100 may authenticate the person 30 based on the motions of the facial muscles of the person 30. For example, the authentication device 100 stores registration data including the motion feature amount of the facial muscle of the person 30 obtained by analyzing the registration moving picture of the person 30 and the person identification information that enables identification of the person 30. The authentication device 100 stores the registration data for a plurality of persons 30.

The authentication device 100 may receive, from the camera 200, the authentication moving picture of the person 30 captured by the camera 200 for authentication. Capturing for authentication may involve capturing the person 30 by using the camera 200 when authenticating the person 30. Capturing for authentication may involve informing the person 30 that he/she is captured for authentication and capturing the person 30 by the camera 200. Capturing for authentication may involve capturing the person 30 by using the camera 200 while the camera 200 is set in the authentication mode. Capturing for authentication may involve capturing the person 30 by using the camera 200 while the authentication device 100 is set in the authentication mode.

The authentication device 100 may authenticate the person 30 by comparing the motion feature amount of the facial muscle of the person 30, identified by analyzing the authentication moving picture, to the feature amounts of a plurality of registration data.

The authentication device 100 may authenticate the person 30 who is walking, based on the motions of the body muscles of the person 30. For example, the authentication device 100 stores registration data including the motion feature amount of the body muscle of the person 30 obtained by analyzing the registration moving picture of the person 30 and the person identification information that enables identification of the person 30. The authentication device 100 stores the registration data for a plurality of persons 30. The authentication device 100 may authenticate the person 30 by comparing the motion feature amount of the body muscles of the person 30, identified by analyzing the authentication moving picture, to the feature amounts of a plurality of registration data.

FIG. 2 schematically shows an example of the feature amount 310. The authentication device 100 obtains the feature amount 310 by analyzing the moving picture of the person 30. The authentication device 100 obtains the feature points of the face of the person 30 by using the 2D video or depth information in the moving picture. The authentication device 100 generates a 3D mesh of the face of the person 30, for example.

The authentication device 100 may retain the vertex coordinates (3D or 2D) of the 3D mesh and use the tracked vertex coordinates, which move as the facial expression changes, as the feature amount of the motions of the facial muscles of the person 30. The coordinates are assumed to be in Local coordinate system, although they may also be in Euler coordinate system or Quaternion coordinate system. The vertex coordinate may retain Local coordinate system, as exemplified as the feature amount 310 in FIG. 2, or may retain only differential values at time t=0, as exemplified as the feature amount 320 in FIG. 3.

Similarly, the authentication device 100 obtains the feature points of the body of the person 30 by using the 2D video or depth information of the moving picture. The authentication device 100 generates the 3D mesh of the body of the person 30, for example. The authentication device 100 may then retain the vertex coordinates (3D or 2D) of the 3D mesh and use the tracked vertex coordinates, which move according to the change of the body such as in walking, as the feature amount of the motions of the body muscles of the person 30.

Figure 4:
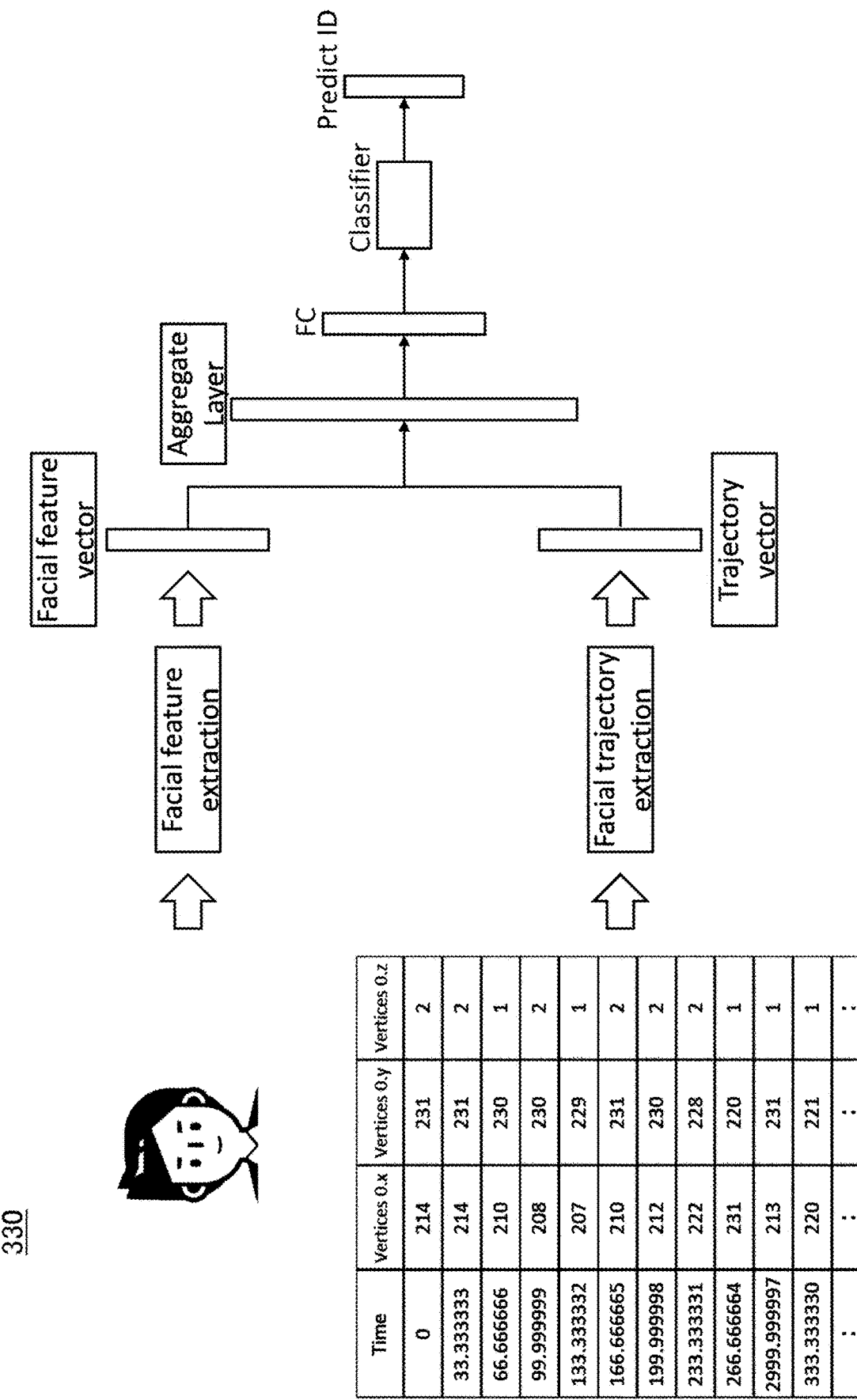
FIG. 4 schematically shows an example of an authentication network 330.

FIG. 4 schematically shows an example of the authentication network 330. The authentication network 330 may be an example of a neural network the input of which is the moving picture including the person as the subject and the output of which is feature amount vectors. Here, the authentication network 330 which performs authentication using the features of the face of the person 30 and the motions of the facial muscles is exemplified.

The authentication device 100 extracts the features of the face of the person 30 by analyzing the authentication moving picture and generates the face feature vectors. The authentication device 100 extracts the trajectory of the face of the person 30, that is, the motions of the facial muscles of the person 30 by analyzing the authentication moving picture and generates face trajectory vectors. The authentication device 100 then aggregates the face feature vectors and the face trajectory vectors and outputs the result. If the authentication is successful, the authentication device 100 outputs the person identification information of the person 30.

Figure 5:
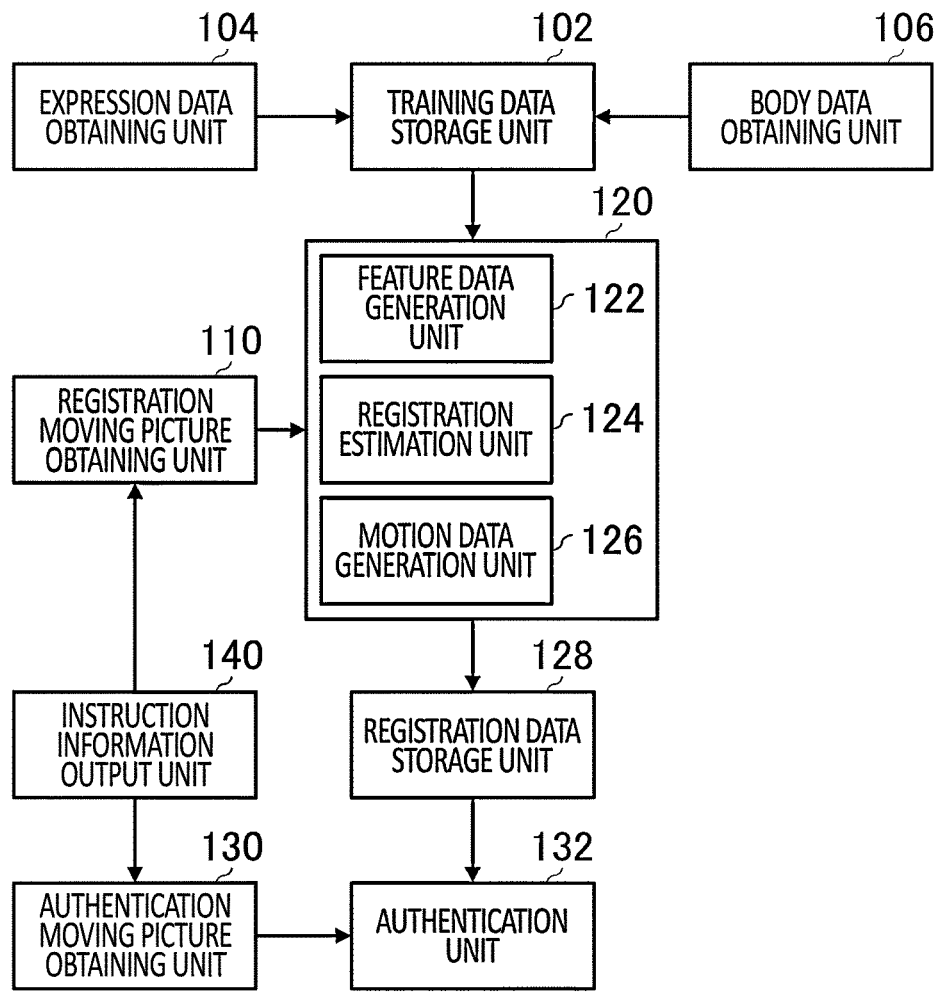
FIG. 5 schematically shows an example of a functional arrangement of an authentication device 100.

FIG. 5 schematically shows an example of the functional arrangement of the authentication device 100. The authentication device 100 includes a training data storage unit 102, a facial expression data obtaining unit 104, a body data obtaining unit 106, a registration moving picture obtaining units 110 and 120, a registration data storage unit 128, an authentication moving picture obtaining unit 130, an authentication unit 132, and an instruction information output unit 140. It is noted that the authentication device 100 does not necessarily include all of them.

The training data storage unit 102 stores the training data of the motions of the face. The motions of the face may be the motions of the facial expression. The training data may include the moving picture of a moving face. The training data may include feature amounts of the motions of the facial muscles when the face shows the motions in the moving picture. The training data storage unit 102 stores a plurality of training data. The training data storage unit 102 stores a large amount of the training data. The training data storage unit 102 may store the training data that is received from the outside or registered from the outside.

The facial expression data obtaining unit 104 obtains the facial expression data that indicates the motions of the facial expression of the person 30. The facial expression data obtaining unit 104 may obtain the facial expression data corresponding to each of a plurality of parameters by inputting the plurality of parameters to a simulator that generates facial expression data indicating the motions of the facial expression of the person by simulating the motions of the facial muscles of the person according to the input of the parameter related to a motor neuron. The motor neuron is sometimes referred to as a motoneuron. The training data storage unit 102 stores training data including facial expression data obtained by the facial expression data obtaining unit 104 and the parameter corresponding to the facial expression data.

A muscle is connected to a motor neuron and the muscle moves by being contracted by a signal transmitted as a result of the firing of the motor neuron. For example, the simulator connects motor neurons to facial muscles and uses Hodgkin-Huxley's model (A. L. Hodgkin, A. A quantitative description of membrane current and its application to conduction and excitation in nerve, from the physiological laboratory. University of Cambridge, pp. 500-544, 1952.) for calculating the firing of the signal. In addition, Hill's model is used for the contraction model of muscles. This enables a simulation of the fine motions of muscles and a virtual extraction of feature points based on the motion of each muscle, which can be used as training data. The facial expression data obtaining unit 104 can take the strength of a signal, the number of motor neurons, the firing rate and synchronization of each neuron, the connectome of the motor neuron, the Min and Max of Hill's model or the like as a parameter to generate training data with a wide range of variation.

The simulator may also automatically generate the shape of a face by using a technique such as photo real or morphing. In this way, since the combination of the motions of the face and the shape of the face also generates variation, sufficient data for training can be automatically generated.

The authentication device 100 may use any existing simulator, provided that facial expression data can be generated. The data extracted from a 3D sensor or a moving picture is noisy. In addition, it needs significant effort to obtain a large amount of training data from individuals or many people. In contrast, the facial expression data obtaining unit 104 can use the simulator to obtain a large amount of facial expression data with a wide range of variation.

The facial expression data obtaining unit 104 may obtain the facial expression data corresponding to each of a plurality of parameters by inputting the plurality of parameters to a simulator that generates facial expression data indicating the motions of the facial expression of the person by simulating the motions of the facial muscles of the person according to the input of parameters other than a motor neuron.

The body data obtaining unit 106 obtains motion data indicating the motions of the body of the person 30. The body data obtaining unit 106 may obtain the body data corresponding to each of a plurality of parameters by inputting the plurality of parameters to the simulator that generates body data indicating the motions of the body of a person by simulating the motions of a body muscle of the person according to the input of the parameter related to the motor neuron. The training data storage unit 102 stores the training data including the body data obtained by the body data obtaining unit 106 and the parameter corresponding to the body data.

For example, the simulator connects a motor neuron to a body muscle and uses Hodgkin-Huxley's model to calculate the firing of the signal. In addition, Hill's model is used for the contraction model of muscles. The body data obtaining unit 106 can take the strength of a signal, the number of motor neurons, the firing rate and synchronization of each neuron, the connectome of the motor neuron, the Min and Max of Hill's model or the like as a parameter to generate training data with a wide range of variation. The simulator may also automatically generate the shape of the body by using a technique such as photo real or morphing. In this way, since the combination of the motions of the face and the shape of the face also generate variation, sufficient data for training can be automatically generated. The authentication device 100 may use any existing simulator, provided that motion data can be generated.

The registration moving picture obtaining unit 110 obtains the registration moving picture in which the person 30 is captured for registration. The registration moving picture obtaining unit 110 may receive, from the camera 200, the registration moving picture captured by the camera 200. The registration moving picture obtaining unit 110 may receive, from the camera 200, the registration moving picture in which the person 30 performing a predetermined behavior is captured. Examples of the predetermined behavior may include the behavior of transitioning from a blank expression into a smile, the behavior of speaking a predetermined word such as "a, l, u, e, o", or the like, but is not limited thereto and may be any behavior.

The registration processing unit 120 performs a registration process by using the registration moving picture obtained by the registration moving picture obtaining unit 110. The registration processing unit 120 has a feature data generation unit 122, a registration estimation unit 124, and a motion data generation unit 126.

The feature data generation unit 122 generates feature data indicating the features of the face of the person 30 by analyzing the registration moving picture. The feature data may include the features of the shape of the face of the person 30. The feature data may include the features of the shape of an eye of the person 30. The feature data may include the features of the shape of the nose of the person 30. The feature data may include the features of the shape of the mouth of the person 30. The feature data may include the relationship between parts of the face of the person 30. Examples of the relationship between the parts include the interval of the eyes, the positional relationship between the eyes and the nose, the positional relationship between the eyes and the mouth, the positional relationship between the nose and the mouth, the positions of the eyes, the nose, and the mouth in the face, and the like. The feature data may include the feature of the fat on the face of the person 30. Examples of the features of the fat include the position of the fat, the thickness of the fat, and the like. The feature data may include the feature of the wrinkles on the face of the person 30.

The feature data generation unit 122 may generate the feature data indicating the gender of the person 30 by analyzing the registration moving picture. The feature data generation unit 122 may generate the feature data indicating the age of the person 30 by analyzing the registration moving picture.

The registration estimation unit 124 estimates the motor neurons of the face of the person 30 based on the motions of the facial muscles of the person 30 identified by analyzing the registration moving picture. The registration estimation unit 124 may estimate the motor neurons of the face of the person 30 based on a plurality of training data stored in the training data storage unit 102. For example, the registration estimation unit 124 may estimate the motor neurons of the face of the person 30 by identifying the parameter of the training data among the plurality of training data the facial expression data of which corresponds to the motions of the facial muscles of the person 30 identified by analyzing the registration moving picture.

The motion data generation unit 126 generates the motion data indicating the motions of the facial muscles of the person 30 by analyzing the registration moving picture. The motion data generation unit 126 may generate the motion data indicating the motions of the facial muscles of the person 30 based on the plurality of training data stored in the training data storage unit 102. The motion data generation unit 126 may generate the motion data indicating the motions of the facial muscles of the person 30 by identifying the parameter of the training data among the plurality of training data the facial expression data of which corresponds to the motions of the facial muscles of the person 30 identified by analyzing the registration moving picture.

The registration data storage unit 128 stores registration data including the motor neurons of the face of the person 30 estimated by the registration estimation unit 124 and the person identification information of the person 30. The registration data storage unit 128 may store the registration data including the motor neurons of the face of the person 30 estimated by the registration estimation unit 124, the feature data generated by the feature data generation unit 122, and the person identification information of the person 30. The registration data storage unit 128 may store registration data including the motion data generated by the motion data generation unit 126 and the person identification information of the person 30. The registration data storage unit 128 stores registration data for a plurality of persons 30.

The authentication moving picture obtaining unit 130 obtains the authentication moving picture in which the person 30 is captured for authentication. The authentication moving picture obtaining unit 130 may receive, from the camera 200, the authentication moving picture captured by the camera 200. The authentication moving picture obtaining unit 130 may receive, from the camera 200, the authentication moving picture in which the person 30 performing a predetermined behavior is captured. The behavior may be the same as the behavior in a case where the registration moving picture obtaining unit 110 captures the person 30 performing the predetermined behavior.

The authentication unit 132 authenticates the person 30 based on the motions of the facial muscles of the person 30 identified by analyzing the authentication moving picture obtained by the authentication moving picture obtaining unit 130. The authentication unit 132 may authenticate the person 30 by using machine learning. The authentication unit 132 may authenticate the person 30 by using the neural network the input of which is the moving picture including the person as the subject and the output of which is the feature amount vector. The authentication unit 132 may use machine learning. The authentication unit 132 may use a deep neural network. The authentication unit 132 may use the deep neural network that involves a time sequence. The authentication unit 132 uses a recurrent neural network, for example. The authentication unit 132 uses LSTM, for example. For example, the authentication unit 132 estimates the motor neurons of the face of the person 30 based on the motions of the facial muscles of the person 30 identified by analyzing the authentication moving picture obtained by the authentication moving picture obtaining unit 130 and authenticates the person 30 by comparing the estimated motor neurons to the motor neurons of the plurality of registration data stored in the registration data storage unit 128.

The authentication unit 132 may estimate the motor neuron of the face of the person 30 based on a plurality of training data stored in the training data storage unit 102. For example, the authentication unit 132 may estimate the motor neuron of the face of the person 30 by identifying the parameter of the training data among the plurality of training data the facial expression data of which corresponds to the motions of the facial muscles of the person 30 identified by analyzing the authentication moving picture.

For example, the authentication unit 132 determines that the authentication is successful if there is registration data including the motor neurons that has a higher similarity to the estimated motor neuron than a predetermined threshold, and if not, it determines that the authentication is a failure. If the authentication is successful, the authentication unit 132 may output the person identification information of the registration data including the motor neuron corresponding to the estimated motor neuron.

The registration data storage unit 128 may store a plurality of registration data which are grouped based on each feature of the parts of the face of the person 30. The authentication unit 132 may authenticate the person 30 by identifying the group corresponding to the feature of the part of the face of the person 30 identified through analysis of the authentication moving picture and comparing the motor neurons of the plurality of registration data belonging to the identified group stored in the registration data storage unit 128 to the motor neurons of the face of the person 30 estimated based on the motions of the facial muscles of the person 30 identified through analysis of the authentication moving picture. For example, if the person 30 to be authenticated has a round face, the authentication unit 132 performs authentication by narrowing down to the plurality of registration data belonging to the group of round face. For example, if the person 30 to be authenticated has a relatively large nose, the authentication unit 132 performs authentication by narrowing down to the plurality of registration data belonging to the group of relatively large nose. For example, if the person 30 to be authenticated has relatively narrow eyes, the authentication unit 132 performs authentication by narrowing down to the plurality of registration data belonging to the group of relatively narrow eyes. This may help reduce the processing load of the authentication device 100 and improve the authentication precision.

The registration data storage unit 128 may store a plurality of registration data which are grouped based on each feature of the fat on the face of the person 30 for each. The authentication unit 132 may authenticate the person 30 by identifying the group corresponding to the feature of the fat on the face of the person 30 identified through analysis of the authentication moving picture and comparing the motor neurons of the plurality of registration data belonging to the identified group stored in the registration data storage unit 128 to the motor neurons of the face of the person 30 estimated based on the motions of the facial muscles of the person 30 identified through analysis of the authentication moving picture. This may help reduce the processing load of the authentication device 100 and improve the authentication precision.

The registration data storage unit 128 may store the plurality of registration data which are grouped based on the gender of the person 30. The authentication unit 132 may authenticate the person 30 by identifying the group corresponding to the gender of the person 30 identified through analysis of the authentication moving picture and comparing the motor neurons of the plurality of registration data belonging to the identified group stored in the registration data storage unit 128 to the motor neurons of the face of the person 30 estimated based on the motions of the facial muscles of the person 30 identified through analysis of the authentication moving picture. This may help reduce the processing load of the authentication device 100 and improve the authentication precision.

The registration data storage unit 128 may store the plurality of registration data which are grouped based on the age of the person 30. The authentication unit 132 may authenticate the person 30 by identifying the group corresponding to the age of the person 30 identified through analysis of the authentication moving picture and comparing the motor neurons of the plurality of registration data belonging to the identified group stored in the registration data storage unit 128 to the motor neurons of the face of the person 30 estimated based on the motions of the facial muscles of the person 30 identified through analysis of the authentication moving picture. This may help reduce the processing load of the authentication device 100 and improve the authentication precision.

The authentication unit 132 may authenticate the person 30 by comparing the data indicating the motions of the facial muscles of the person 30 generated through analysis of the authentication moving picture obtained by the authentication moving picture obtaining unit 130 to the motion data of the plurality of registration data stored in the registration data storage unit 128.

The instruction information output unit 140 outputs the instruction information that instructs the person 30 to perform a predetermined behavior. After the instruction information output unit 140 outputs the instruction information, the registration moving picture obtaining unit 110 may obtain the registration moving picture in which the person 30 is captured. After the instruction information output unit 140 outputs the instruction information, the authentication moving picture obtaining unit 130 may obtain the authentication moving picture in which the person 30 is captured.

For example, when performing registration of the person 30, the instruction information output unit 140 outputs the instruction information by displaying it on the display arranged near the camera 200 or outputs the instruction information with voice by using the speaker arranged near the camera 200. For example, when performing authentication of the person 30, the instruction information output unit 140 outputs the instruction information, which is similar to that used for registration, by displaying it on the display arranged near the camera 200 or outputs the instruction information, which is similar to that used for registration, through voice by using the speaker arranged near the camera 200. In this way, during authentication, the person 30 can be instructed to perform the same behavior as that performed during registration, which may help improve the authentication precision.

The registration moving picture obtaining unit 110 may obtain the registration moving picture in which the person 30 is captured while walking. For example, the registration moving picture obtaining unit 110 receives, from the camera 200, the registration moving picture in which the person 30 is captured for registration by the camera 200 while approaching the camera 200.

The feature data generation unit 122 may generate the feature data indicating the features of the body shape of the person 30 by analyzing the registration moving picture. The feature data may include the feature of the arm shape of the person 30. The feature data may include the features of the leg shape of the person 30. The feature data may include the relationship between the parts of the body of the person 30.

The registration estimation unit 124 may estimate the motor neurons of the body of the person 30 based on the motions of the body muscles of the person 30 identified by analyzing the registration moving picture. The registration estimation unit 124 may estimate the motor neuron of the body of the person 30 based on the plurality of training data stored in the training data storage unit 102. For example, the registration estimation unit 124 may estimate the motor neurons of the body of the person 30 by identifying the parameter of the training data among the plurality of training data the body data of which corresponds to the motions of the body muscles of the person 30 identified by analyzing the registration moving picture.

The motion data generation unit 126 generates the motion data indicating the motions of the body muscles of the person 30 by analyzing the registration moving picture. The motion data generation unit 126 may generate the motion data indicating the motions of the body muscles of the person 30 based on the plurality of training data stored in the training data storage unit 102. The motion data generation unit 126 may generate the motion data indicating the motions of the body muscles of the person 30 by identifying the parameter of the training data among the plurality of training data the body data of which corresponds to the motions of the body muscles of the person 30 identified by analyzing the registration moving picture.

The registration data storage unit 128 may store the registration data including the motor neuron of the face of the person 30 and the motor neuron of the body of the person 30, which are estimated by the registration estimation unit 124, and the person identification information of the person 30.

The authentication moving picture obtaining unit 130 may obtain the authentication moving picture in which the person 30 is captured while walking. For example, the authentication moving picture obtaining unit 130 receives, from the camera 200, the authentication moving picture in which the person 30 is captured by the camera 200 while approaching the camera 200 for authentication.

The authentication unit 132 may also authenticate the person 30 based on the motions of the body muscles of the person 30 and the motions of the facial muscles of the person 30, which are identified through analysis of the authentication moving picture. For example, the authentication unit 132 authenticates the person 30 by estimating the motor neurons of the face and the motor neurons of the body of the person 30 based on the motions of the facial muscles of the person 30 and the motions of the body muscles of the person 30, which are identified through analysis of the authentication moving picture, and comparing the estimated motor neurons of the face and motor neurons of the body to the motor neurons of the face and the motor neurons of the body of the plurality of registration data stored in the registration data storage unit. For example, the authentication unit 132 authenticates the person 30 by identifying the plurality of registration data corresponding to the estimated motor neurons of the body of the person 30 from the plurality of registration data stored in the registration data storage unit 128 and comparing the estimated motor neurons of the face of the person 30 to the identified motor neurons of the face of the plurality of registration data. In this way, for example, the analysis result of the authentication moving picture in which the person 30 is captured while approaching the camera 200 enables narrowing down the registration data used for the authentication with the motions of the facial muscles, which may help reduce the processing load of the authentication device 100 and improve the authentication precision.

The authentication device 100 may authenticate the person 30 based on the motions of the body muscles of the person 30 rather than the motions of the facial muscles of the person 30. In this case, the authentication moving picture obtaining unit 130 obtains the authentication moving picture in which the person 30 is captured for authentication while walking and the authentication unit 132 authenticates the person 30 based on the motions of the body muscles of the person 30 identified through analysis of the authentication moving picture.

The authentication unit 132 may authenticate the person 30 by estimating the motor neurons of the body of the person 30 based on the motions of the body muscles of the person 30 identified through analysis of the authentication moving picture obtained by the authentication moving picture obtaining unit 130 and comparing the estimated motor neurons to the motor neurons of the plurality of registration data stored in the registration data storage unit 128.

The authentication unit 132 may estimate the motor neuron of the body of the person 30 based on the plurality of training data stored in the training data storage unit 102. For example, the authentication unit 132 may estimate the motor neuron of the body of the person 30 by identifying the parameter of the training data among the plurality of training data the body data of which corresponds to the motions of the body muscles of the person 30 identified by analyzing the authentication moving picture.

The registration data storage unit 128 may store a plurality of registration data which are grouped based on each feature of the parts of the body of the person 30. The authentication unit 132 may authenticate the person 30 by identifying the group corresponding to the feature of the part of the body of the person 30 identified through analysis of the authentication moving picture and comparing the motor neurons of the plurality of registration data belonging to the identified group stored in the registration data storage unit 128 to the motor neurons of the body of the person 30 estimated based on the motions of the body muscles of the person 30 identified through analysis of the authentication moving picture.

The authentication unit 132 may authenticate the person 30 by identifying the group corresponding to the gender of the person 30 identified through analysis of the authentication moving picture and comparing the motor neurons of the plurality of registration data belonging to the identified group stored in the registration data storage unit 128 to the motor neurons of the body of the person 30 estimated based on the motions of the body muscles of the person 30 identified through analysis of the authentication moving picture. The authentication unit 132 may authenticate the person 30 by identifying the group corresponding to the age of the person 30 identified through analysis of the authentication moving picture and comparing the motor neurons of the plurality of registration data belonging to the identified group stored in the registration data storage unit 128 to the motor neurons of the body of the person 30 estimated based on the motions of the body muscle of the person 30 identified through analysis of the authentication moving picture.

Figure 6:
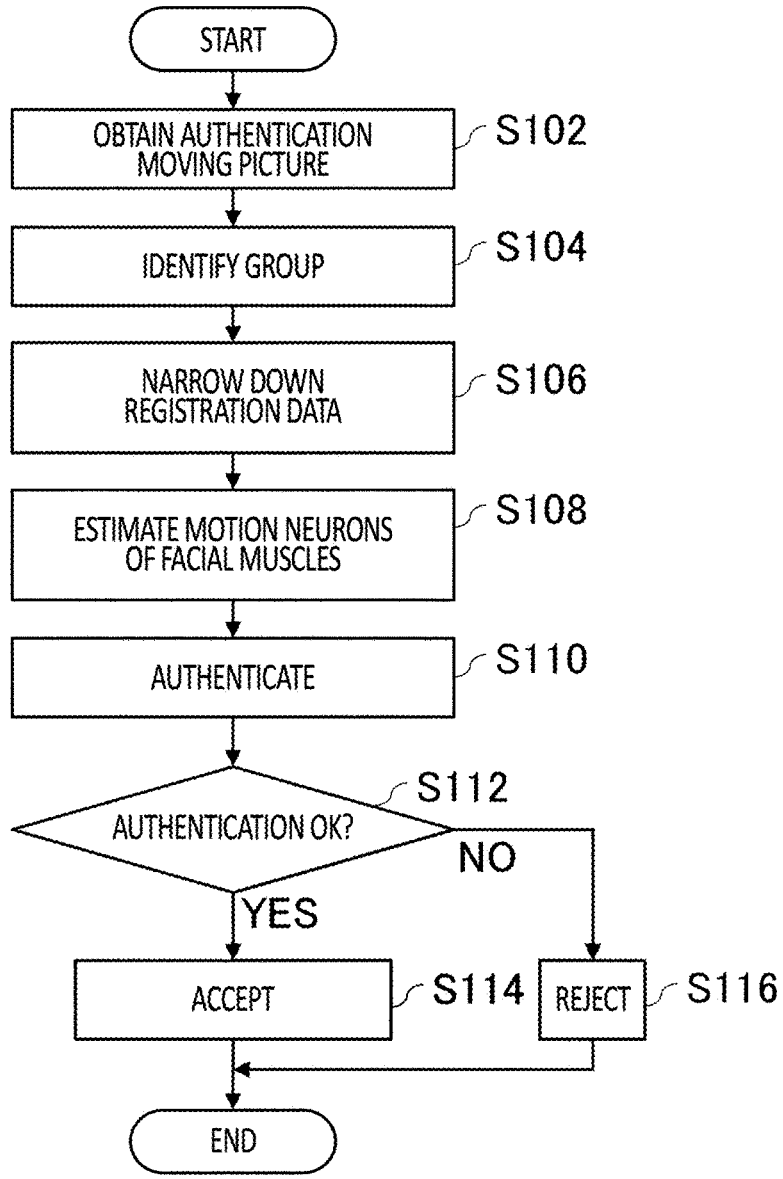
FIG. 6 schematically shows an example of a process flow of the authentication device 100.

FIG. 6 schematically shows an example of a process flow of the authentication device 100. Here, an example of a process flow is shown where the person 30 is authenticated based on the motions of the facial muscles of the person 30 and the determination is made whether to accept the person 30.

In step (step is sometimes simply described as S) 102, the authentication moving picture obtaining unit 130 obtains the authentication moving picture in which the person 30 is captured for authentication. In S104, the authentication unit 132 analyzes the authentication moving picture, extracts the feature of the person 30, and identifies the group that matches the features of the person 30. In S106, the authentication unit 132 narrows down the plurality of registration data stored in the registration data storage unit 128 to the plurality of registration data belonging to the group identified in S104.

In S108, the authentication unit 132 estimates the motor neurons of the face of the person 30 based on the motions of the facial muscles of the person 30 identified through analysis of the authentication moving picture obtained by the authentication moving picture obtaining unit 130 in S102. In S110, the authentication unit 132 authenticates the person 30 by comparing the motor neuron estimated in S108 to the motor neurons of the plurality of registration data that was narrowed down in S106.

If the authentication is successful (YES in S112), the process proceeds to S114. If the authentication is not successful, the process proceeds to S116. In S114, the authentication unit 132 outputs the authentication result that permits acceptance of the person 30. In S116, the authentication unit 132 outputs the authentication result that rejects acceptance of the person 30. Then, the process ends. Here, a case in which the registration data is narrowed down in S104 and S106 has been described, but the registration data may not be narrowed down.

Figure 7:
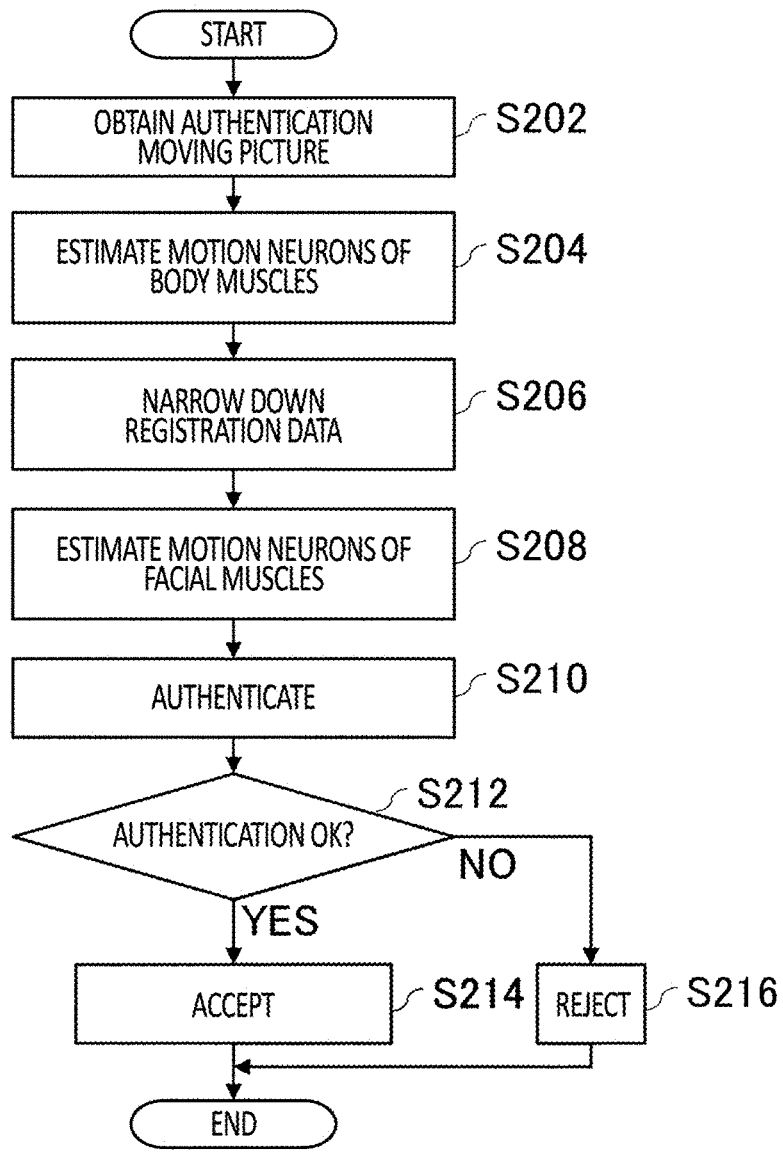
FIG. 7 schematically shows an example of a process flow of the authentication device 100.

FIG. 7 schematically shows an example of a process flow of the authentication device 100. Here, an example of a process flow is shown, where the person 30 is authenticated based on the motions of the facial muscles and the motions of the body muscles of the person 30 and the determination is made whether to accept the person 30.

In S202, the authentication moving picture obtaining unit 130 obtains the authentication moving picture in which the person 30 is captured for authentication. In S204, the authentication unit 132 estimates the motor neurons of the body of the person 30 based on the motions of the body muscles of the person 30 identified through analysis of the authentication moving picture. In S206, the authentication unit 132 narrows down the registration data from the plurality of registration data stored in the registration data storage unit 128 by identifying the plurality of registration data corresponding to the estimated motor neurons of the body of the person 30 in S204.

In S208, the authentication unit 132 estimates the motor neurons of the face of the person 30 based on the motions of the facial muscles of the person 30 identified through analysis of the authentication moving picture obtained by the authentication moving picture obtaining unit 130 in S202. In S210, the authentication unit 132 authenticates the person 30 by comparing the motor neuron estimated in S208 to the motor neurons of the plurality of registration data that was narrowed down in S206.

If the authentication is successful (YES in S212), the process proceeds to S214. If the authentication is not successful, the process proceeds to S216. In S214, the authentication unit 132 outputs the authentication result that permits acceptance of the person 30. In S216, the authentication unit 132 outputs the authentication result that rejects acceptance of the person 30. Then, the process ends.

Figure 8:
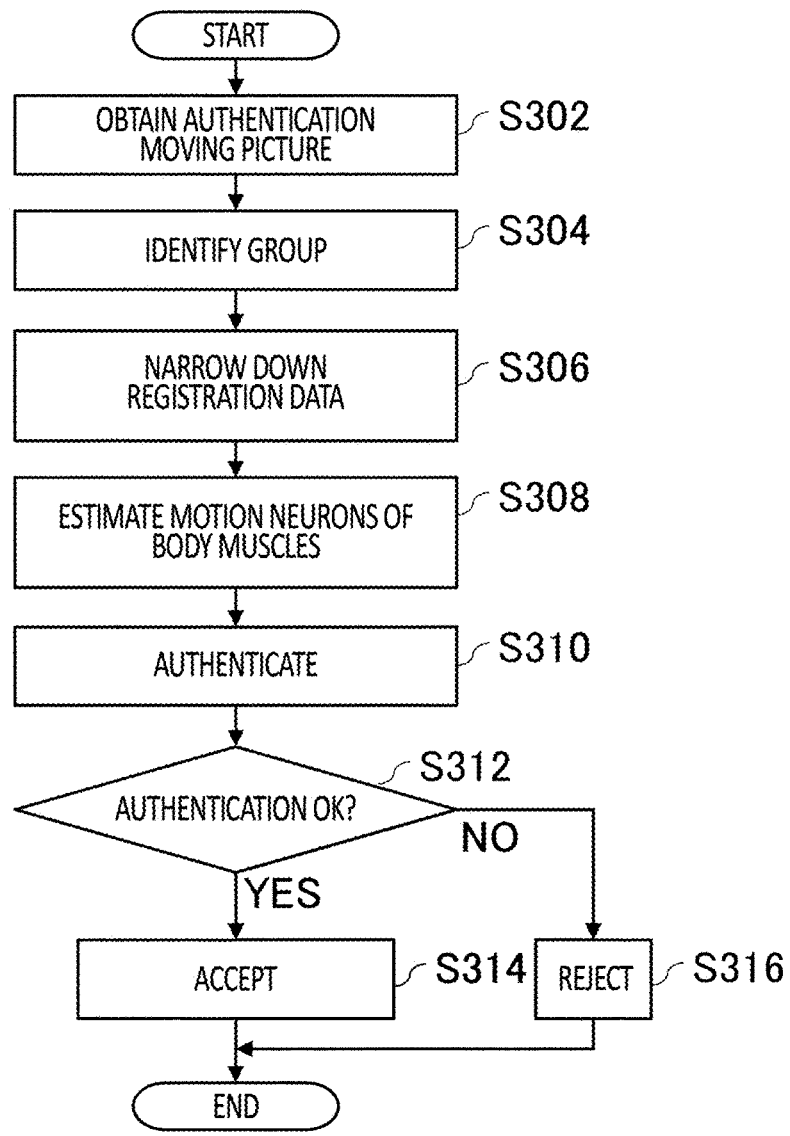
FIG. 8 schematically shows an example of a process flow of the authentication device 100.

FIG. 8 schematically shows an example of a process flow of the authentication device 100. Here, an example of a process flow is shown where the person 30 is authenticated based on the motions of the body muscles of the person 30 and the determination is made whether to accept the person 30.

In S302, the authentication moving picture obtaining unit 130 obtains the authentication moving picture in which the person 30 is captured for authentication. In S304, the authentication unit 132 analyzes the authentication moving picture, extracts the feature of the person 30, and identifies the group that matches the features of the person 30. In S306, the authentication unit 132 narrows down the plurality of registration data stored in the registration data storage unit 128 to the plurality of registration data belonging to the group identified in S304.

In S308, the authentication unit 132 estimates the motor neurons of the body of the person 30 based on the motions of the body muscles of the person 30 identified through analysis of the authentication moving picture obtained by the authentication moving picture obtaining unit 130 in S102. In S310, the authentication unit 132 authenticates the person 30 by comparing the motor neuron estimated in S308 to the motor neurons of the plurality of registration data that was narrowed down in S306.

If the authentication is successful (YES in S312), the process proceeds to S314. If the authentication is not successful, the process proceeds to S316. In S314, the authentication unit 132 outputs the authentication result that permits acceptance of the person 30. In S316, the authentication unit 132 outputs the authentication result that rejects acceptance of the person 30. Then, the process ends. Here, a case in which the registration data is narrowed down in S304 and S306 has been described, but the registration data may not be narrowed down.

Figure 9:
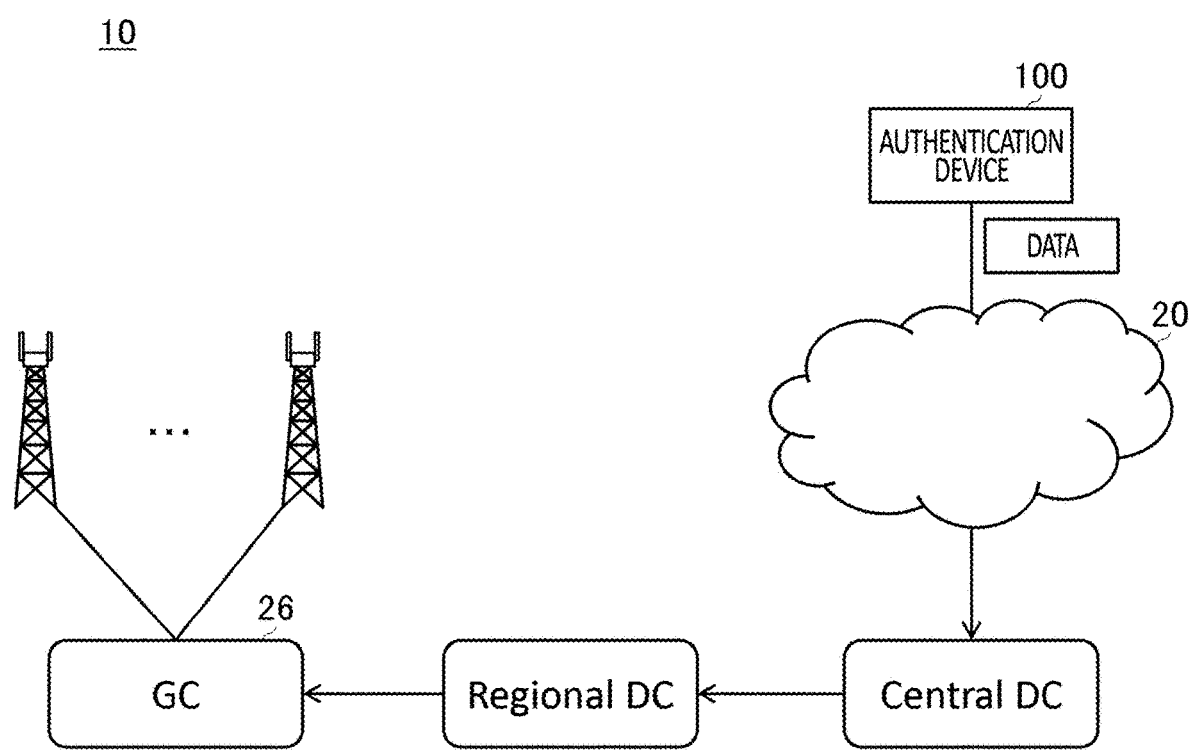
FIG. 9 schematically shows an example of the system 10.

FIG. 9 schematically shows an example of the system 10. In the system 10 shown in FIG. 9, a distributed authentication process in a mobile communication network is achieved. The authentication devices 100 may be deployed by being distributed across Multi access Edge Computing (MEC). The authentication device 100 arranged on the MEC may perform the authentication on the moving picture captured by the camera 200 in the area corresponding to the MEC.

The system 10 may include the authentication device 100 arranged on each of the plurality of MECs and the authentication device 100 connected to the network 20. In the example shown in FIG. 9, the authentication device 100 arranged on the MEC is sometimes referred to as a distributed authentication device and the authentication device 100 connected to the network 20 is sometimes referred to as a management authentication device.

The management authentication device manages the data used to authenticate registration data or the like and provides data to the distributed authentication device as appropriate. The distributed authentication device performs authentication by using the data obtained from the management authentication device.

The management authentication device may use the information of the GC 26 that detected radio waves. In the system 10, in the mobile communication network, data is cached at the location that is closest to the DC that caught radio waves (GC 26). In other words, data is temporarily cached at the closest location (GC 26) during usage (authentication).

When radio waves are caught in the mobile communication network, the management authentication device may extract, from the registration data storage unit 128, the data corresponding to the owner of the user terminal that has transmitted the radio waves and transmit it to the GC 26 that is closest to the DC that caught radio waves. If not used, the cached data may be cleared after a predetermined period of time elapses.

In the system 10, since position information managed in the mobile communication network is used, the area to which the data should be transmitted can be identified without using a GPS or the like.

The management authentication device may transmit, to the GC 26, the data to which the searchable encryption has been applied. The searchable encryption is an encryption that enables the searching of data while it remains encrypted. In the distributed authentication device, decrypting data each time data is searched for poses a high risk in the event of leakage. If the distributed authentication device has decrypted data even temporarily, what is searched for is found in the event of leakage. Especially, if the image in which the person 30 is captured is used, the image of the person 30 may be leaked. If the registration is not smoothly performed due to such concerns, the operation of the authentication system will be disrupted. In contrast, the management authentication device that transmits, to the GC 26, the data to which the searchable encryption has been applied enables the authentication process to be performed without decryption while concealing what is searched for in the event of leakage, which can reduce the risk in the event of leakage.

The management authentication device may not have an authentication function. In other words, the management authentication device may not have the authentication moving picture obtaining unit 130 and the authentication unit 132.

The distributed authentication device may not have a registration function. In other words, the distributed authentication device may not have the training data storage unit 102, the facial expression data obtaining unit 104, the body data obtaining unit 106, the registration moving picture obtaining unit 110, and the registration processing unit 120.

Figure 10:
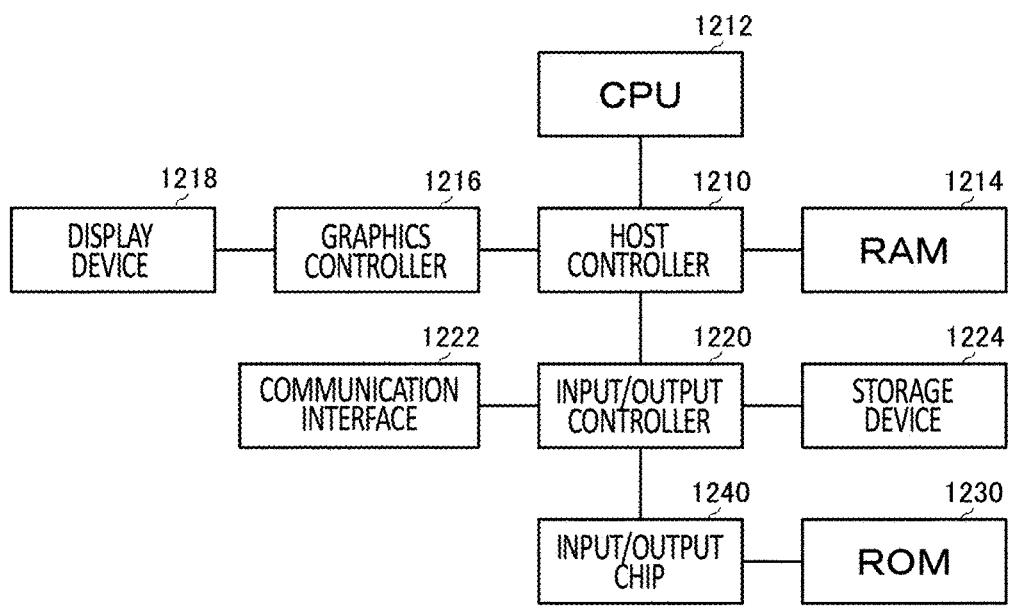
FIG. 10 schematically shows an example of a hardware configuration of the computer 1200 which functions as the authentication device 100.

FIG. 10 schematically shows an example of a hardware configuration of the computer 1200 which functions as the authentication device 100. A program installed in the computer 1200 can cause the computer 1200 to function as one or more "units" of an apparatus according to the present embodiment, or cause the computer 1200 to perform operations associated with the apparatus or perform one or more "units" thereof according to the present embodiment, and/or cause the computer 1200 to perform the process according to the present embodiment or perform the steps of the process. Such a program may be executed by a CPU 1212 to cause the computer 1200 to perform particular operations associated with some or all of the blocks in the flowcharts and block diagrams described in the specification.

The computer 1200 according to the present embodiment includes the CPU 1212, a RAM 1214, and a graphics controller 1216, which are connected to each other via a host controller 1210. The computer 1200 also includes input/output units such as a communication interface 1222, a storage device 1224, a DVD drive and an IC card drive, which are connected to the host controller 1210 via an input/output controller 1220. The DVD drive may be a DVD-ROM drive, a DVD-RAM drive, etc. The storage device 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates according to the programs stored in the ROM 1230 and the RAM 1214, thereby controlling each unit. The graphics controller 1216 acquires image data which is generated by the CPU 1212 in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive reads the programs or the data from the DVD-ROM or the like, and provides the storage device 1224 with the programs or the data. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as the DVD-ROM or the IC card. The program is read from the computer-readable storage medium, installed into the storage device 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. A device or method may be constituted by realizing the operation or processing of information in accordance with the usage of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage device 1224, the DVD drive (DVD-ROM), the IC card, etc., and perform various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby acquiring the attribute value of the second attribute associated with the first attribute satisfying a predetermined condition.

The above described program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent steps of processes in which operations are performed or "units" of apparatuses responsible for performing operations. A specific step and "unit" may be implemented by dedicated circuitry, programmable circuitry supplied along with a computer-readable instruction stored on a computer-readable storage medium, and/or a processor supplied along with the computer-readable instruction stored on the computer-readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer-readable storage medium may include any tangible device capable of storing an instruction performed by an appropriate device, so that the computer-readable storage medium having the instruction stored thereon constitutes a product including an instruction that may be performed in order to provide means for performing an operation specified by a flowchart or a block diagram. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

The computer-readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer-readable instruction to provide means for performing operations specified by the flowchart or the block diagram. Examples of the processor include a computer processor, a processing unit, a microprocessor, a digital signal processor, a controller, a microcontroller, and the like.

While the present invention has been described by way of the embodiments, the technical scope of the present invention is not limited to the scope described in the above-described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or diagrams, it does not necessarily mean that the process must be performed in this order.

EXPLANATION OF REFERENCES

10: system;
20: network;
26: GC;
30: person;
100: authentication device;
102: training data storage unit;
104: facial expression data obtaining unit;
106: body data obtaining unit;
110: registration moving picture obtaining unit;
120: registration processing unit;
122: feature data generation unit;
124: registration estimation unit;
126: motion data generation unit;
128: registration data storage unit;
130: authentication moving picture obtaining unit;
132: authentication unit;
140: instruction information output unit;
200: camera;
310: feature amount;
320: feature amount;
330: authentication network;
1200: computer;
1210: host controller;
1212: CPU;
1214: RAM;
1216: graphics controller;
1218: display device;
1220: input/output controller;
1222: communication interface;
1224: storage device;
1230: ROM;
1240: input/output chip.

What is claimed is:

1. An authentication device comprising:
an authentication moving picture obtaining unit which obtains an authentication moving picture in which a person is captured for authentication; and
an authentication unit which authenticates the person by estimating motor neurons of a face of the person based on motions of facial muscles of the person identified through analysis of the authentication moving picture and using the motor neurons which has been estimated.

2. The authentication device according to claim 1, further comprising a registration data storage unit which stores, for a plurality of persons, registration data including motor neurons of a face of a person among the plurality of persons and person identification information that enables identification of the person,
wherein the authentication unit authenticates the person by comparing the motor neurons which have been estimated to motor neurons of the plurality of registration data stored in the registration data storage unit.

3. The authentication device according to claim 2, further comprising a registration moving picture obtaining unit which obtains a registration moving picture in which a person is captured for registration; and
a registration estimation unit which estimates motor neurons of a face of the person based on motions of facial muscles of the person identified through analysis of the registration moving picture,
wherein the registration data storage unit stores, for the plurality of persons, the registration data including the motor neurons estimated by the registration estimation unit and person identification information that enables identification of the person.

4. The authentication device according to claim 3, further comprising:
a facial expression data obtaining unit which obtains facial expression data corresponding to each of a plurality of parameters by inputting the plurality of parameters to a simulator that generates the facial expression data that indicates motions of a facial expression of a person by simulating motions of facial muscles of the person according to an input of a parameter related to motor neurons; and
a training data storage unit which stores training data including the facial expression data obtained by the facial expression data obtaining unit and a parameter corresponding to the facial expression data,
wherein the registration estimation unit estimates motor neurons of the face of the person based on a plurality of the training data stored in the training data storage unit.

5. The authentication device according to claim 4, wherein the registration estimation unit estimates motor neurons of the face of the person by identifying the parameter of the training data among the plurality of training data the facial expression data of which corresponds to motions of facial muscles of the person identified through analysis of the registration moving picture.

6. The authentication device according to claim 4, wherein the authentication unit estimates motor neurons of a face of the person based on a plurality of the training data stored in the training data storage unit.

7. The authentication device according to claim 3, wherein the registration data storage unit stores the plurality of registration data which are grouped based on each feature of a part of a face of a person, and the authentication unit authenticates the person by identifying a group corresponding to a feature of a part of a face of the person identified through analysis of the authentication moving picture obtained by the authentication moving picture obtaining unit and comparing motor neurons of a plurality of registration data belonging to the group which has been identified and stored in the registration data storage unit to motor neurons of a face of the person estimated based on motions of facial muscles of the person identified through analysis of the authentication moving picture.

8. The authentication device according to claim 3, wherein the registration data storage unit stores the plurality of registration data which are grouped based on each feature of a fat on a face of a person, and the authentication unit authenticates the person by identifying a group corresponding to a feature of how fat is attached to a face of the person identified through analysis of the authentication moving picture obtained by the authentication moving picture obtaining unit and comparing motor neurons of a plurality of registration data corresponding to the group which has been identified and stored in the registration data storage unit to motor neurons of a face of the person estimated based on motions of facial muscles of the person identified through analysis of the authentication moving picture.

9. The authentication device according to claim 3, wherein the registration data storage unit stores the plurality of registration data which are grouped based on a gender of a person, and the authentication unit authenticates the person by identifying a group corresponding to the gender of the person identified through analysis of the authentication moving picture obtained by the authentication moving picture obtaining unit and comparing motor neurons of a plurality of registration data corresponding to the group which has been identified and stored in the registration data storage unit to motor neurons of a face of the person estimated based on motions of facial muscles of the person identified through analysis of the authentication moving picture.

10. The authentication device according to claim 3, wherein the registration data storage unit stores the plurality of registration data which are grouped based on an age of a person, and the authentication unit authenticates the person by identifying a group corresponding to the age of the person identified through analysis of the authentication moving picture obtained by the authentication moving picture obtaining unit and comparing motor neurons of a plurality of registration data corresponding to the group which has been identified and stored in the registration data storage unit to motor neurons of a face of the person estimated based on motions of facial muscles of the person identified through analysis of the authentication moving picture.

11. The authentication device according to claim 3, further comprising an instruction information output unit which outputs instruction information which instructs the person to perform a predetermined behavior, wherein after the instruction information output unit outputs the instruction information, the registration moving picture obtaining unit obtains the registration moving picture in which a face of the person is captured, and after the instruction information output unit outputs the instruction information, the authentication moving picture obtaining unit obtains the authentication moving picture in which a face of the person is captured.

12. The authentication device according to claim 3, wherein the authentication moving picture obtaining unit obtains the authentication moving picture in which the person is captured while walking, and the authentication unit authenticates the person based on motions of body muscles of the person identified through analysis of the authentication moving picture and motions of facial muscles of the person.

13. The authentication device according to claim 12, wherein the registration estimation unit estimates motor neurons of a body of the person based on motions of body muscles of the person identified through analysis of the registration moving picture, the registration data storage unit stores the registration data including motor neurons of a face of the person and motor neurons of the body of the person, which are estimated by the registration estimation unit, and person identification information which enables identification of the person, and the authentication unit authenticates the person by estimating motor neurons of the face and motor neurons of the body of the person based on motions of facial muscles of the person and motions of body muscles of the person identified through analysis of the authentication moving picture obtained by the authentication moving picture obtaining unit and comparing estimated motor neurons of the face and motor neurons of the body to motor neurons of the face and motor neurons of the body of the plurality of registration data stored in the registration data storage unit.

14. The authentication device according to claim 13, wherein the authentication unit authenticates the person by identifying a plurality of registration data corresponding to estimated motor neurons of the body of the person from a plurality of registration data stored in the registration data storage unit and comparing estimated motor neurons of the face of the person to identified motor neurons of the face of the plurality of registration data.

15. An authentication device comprising:

an authentication moving picture obtaining unit which obtains an authentication moving picture in which a person is captured for authentication while walking; and an authentication unit which authenticates the person by estimating motor neurons of a body of the person based on motions of body muscles of the person identified through analysis of the authentication moving picture and using the motor neuron which has been estimated.

16. The authentication device according to claim 15, further comprising a registration data storage unit which stores, for a plurality of persons, registration data including motor neurons of the body of a person among the plurality of persons and person identification information that enables identification of the person, wherein the authentication unit authenticates the person by comparing the motor neurons which have been estimated to motor neurons of the plurality of registration data stored in the registration data storage unit.

17. The authentication device according to claim 16, further comprising a registration moving picture obtaining unit which obtains a registration moving picture in which a person is captured for registration while walking; and a registration estimation unit which estimates motor neurons of the body of the person based on motions of body muscles of the person identified through analysis of the registration moving picture, wherein the registration data storage unit stores, for the plurality of persons, the registration data including the motor neurons estimated by the registration estimation unit and person identification information that enables identification of the person.

18. An authentication method performed by a computer, comprising:

obtaining an authentication moving picture in which a person is captured for authentication; and authenticating the person by estimating motor neurons of a face of the person based on motions of facial muscles of the person identified through analysis of the authentication moving picture and using the motor neurons which have been estimated.

19. An authentication method performed by a computer, comprising:

obtaining an authentication moving picture in which a person is captured for authentication while walking; and authenticating the person by estimating motor neurons of a body of the person based on motions of body muscles of the person identified through analysis of the authentication moving picture and using the motor neurons which have been estimated.

20. A non-transitory computer-readable storage medium which stores a program thereon, which causes a computer to:

obtain an authentication moving picture in which a person is captured for authentication; and authenticate the person by estimating motor neurons of a face of the person based on motions of facial muscles of the person identified through analysis of the authentication moving picture and using the motor neurons which have been estimated.

21. A non-transitory computer-readable storage medium which stores a program thereon, which causes a computer to:

obtain an authentication moving picture in which a person is captured for authentication while walking; and authenticate the person by estimating motor neurons of a body of the person based on motions of body muscles of the person identified through analysis of the authentication moving picture and using the motor neurons which have been estimated.

* * * * *